United States Patent
Ornt

(10) Patent No.: US 8,057,930 B2
(45) Date of Patent: Nov. 15, 2011

(54) BATTERY RETAINER

(75) Inventor: Gregory G. Ornt, Sodus Point, NY (US)

(73) Assignee: Harris Corporation, Melbourne, FL (US)

( * ) Notice: Subject to any disclaimer, the term of this patent is extended or adjusted under 35 U.S.C. 154(b) by 707 days.

(21) Appl. No.: 12/193,813

(22) Filed: Aug. 19, 2008

(65) Prior Publication Data

US 2010/0047677 A1 Feb. 25, 2010

(51) Int. Cl.
*H01M 2/10* (2006.01)
*H01M 2/00* (2006.01)

(52) U.S. Cl. .............................. 429/100; 429/96; 429/98

(58) Field of Classification Search .......................... None
See application file for complete search history.

(56) References Cited

U.S. PATENT DOCUMENTS

| | | |
|---|---|---|
| 4,848,568 A | 7/1989 | Eckelman |
| 4,992,987 A | 2/1991 | Echols et al. |
| 5,188,912 A * | 2/1993 | Katoh et al. ..................... 429/96 |
| 6,218,044 B1 | 4/2001 | Suzuka et al. |
| 2004/0076858 A1* | 4/2004 | Bartholf et al. ................... 429/1 |
| 2010/0055550 A1 | 3/2010 | Scott et al. |

* cited by examiner

*Primary Examiner* — Krishnan S Menon

(74) *Attorney, Agent, or Firm* — Fox Rothschild, LLP; Robert J. Sacco

(57) ABSTRACT

A low profile coin cell battery retainer assembly (BRA) is provided. BRA comprises a battery holder (410), a slot (520), and a dielectric band (504). The battery holder is configured for attachment to a circuit board (414). The batter holder is sized and shaped to define a cavity (522) configured for receiving therein a coin cell type battery (412). The slot is provided on a circumferential edge portion (524) of the battery holder. The slot is configured to permit the coin cell type battery to be removably inserted within the cavity. The dielectric band is removably attached to the battery holder. The dielectric band extends around a periphery of the circumferential edge portion so as to secure the coin cell type battery in the cavity.

19 Claims, 6 Drawing Sheets

BATTERY RETAINER

BACKGROUND OF THE INVENTION

1. Statement of the Technical Field

The invention concerns electronic devices comprising one or more batteries. More particularly, the invention concerns retainers configured for preventing batteries from being dislodged from a battery holder or clip due to external forces (e.g., an impact force produced by dropping the electronic device).

2. Description of the Related Art

Electronic devices which comprise internal circuit components are typically powered by external primary batteries. These external primary batteries are often housed in a battery compartment of the electronic device in a manner enabling an electrical connection between the battery and the internal circuit components. However, it is increasingly desirable to provide these internal circuit components with a back-up battery (e.g., battery 102 shown in FIGS. 1-2). The back-up battery can generally be provided for assuring continued retention of stored information in the event of a power loss from the primary power source.

The back-up battery is generally a low profile battery, such as a coin cell battery. Coin cell batteries are well known to those having ordinary skill in the art, and therefore will not be described herein. The back-up battery is often housed in a battery holder (e.g., battery holder 104 shown in FIGS. 1-2) coupled to a printed circuit board (e.g., printed circuit board 106 shown in FIGS. 1-2) that can be disposed within the electronic device. The battery holder generally has a cup-shape with an insertion space or slot (e.g., slot 108 shown in FIG. 2) configured for receiving the back-up battery (as shown in FIGS. 1-2). The insert space or slot is typically provided on a circumferential edge portion (e.g., edge 110 shown in FIGS. 1-2) of the battery holder. The insert space or slot permits the back-up battery to be removably inserted within a cavity (e.g., cavity 112 shown in FIG. 2) defined by the battery holder. Despite the advantages of the conventional battery holder, it suffers from certain drawbacks. For example, the back-up battery may be dislodged from the battery holder when an external force is applied thereto (as shown in FIG. 2). Such external forces include, but are not limited to, an impact force produced by dropping the electronic device.

A plurality of mechanical retainers have been employed for retaining the back-up battery within the battery holder. Such mechanical retainers include, but are not limited to, clips and locking bars. Despite the advantages of these conventional mechanical retainers, they suffer from certain drawbacks. For example, the clips are thin sheet metal parts formed of a conductive material. The clips are configured to be mechanically coupled to the battery holder. Over time, the clips may become bent or deformed. In such a scenario, the clips can become loose or uncoupled from the battery holder when an external force is applied to the electronic device. If the clips become uncoupled from the battery holders, then the clips may provide shorts in the circuits of the electronic devices. Also, the clips are electronically coupled to the positive terminal of the back-up batteries. In effect, the clips increase the positive surface area of the back-up battery assemblies. One can appreciate that this is undesirable in many applications since the increased positive surface area provides a greater potential of a short circuit. Further, the clips are often lost during battery replacement processes.

The locking bars are generally formed of a conductive material with a dielectric sleeve disposed thereon. The locking bars are costly to manufacture and increase the conductive surface area of a PCB. The locking bars also have a relatively large profile. As such, the locking bars consume a relatively large amount of board space. Further, the locking bars have a relatively complicated assembly. In this regard, it should be understood that the locking bars are coupled to PCBs via mechanical connectors (e.g., screws). In effect, various torque tools are required to couple the locking bars to the PCB. The torque tools ensure a particular screw torque value requirement is met.

In view of the forgoing, there is a need for an improved mechanical retainer that can be used in back-up battery retention applications. The improved mechanical retainer needs to be less expensive to manufacture. The improved mechanical retainer needs to have a relatively easy assembly feature. The improved mechanical retainer needs to consume a relatively small amount of board space and provide a relatively low potential for a short circuit.

SUMMARY OF THE INVENTION

The present invention concerns low profile coin cell battery retainer assemblies. Embodiments of the battery retainer assemblies comprise a battery holder, a slot, and a dielectric band. The battery holder is configured for attachment to a circuit board. The battery holder is sized and shaped to define a cavity configured for receiving therein a coin cell type battery. The slot is provided on a circumferential edge portion of the battery holder. The slot is configured to permit the coin cell type battery to be removably inserted within the cavity. A dielectric band is removably attached to the battery holder. The dielectric band extends around a periphery of the circumferential edge portion. In effect, the dielectric band secures the coin cell type battery in the cavity.

According to an aspect of the invention, the dielectric band is formed of an elastic material, such as a silicone rubber. The dielectric band has a ring shape. The dielectric band is sized and shaped so that an inner circumference of the dielectric band will resiliently engage the circumferential edge portion when extended around the periphery of the battery holder.

According to another aspect of the invention, a tether is provided. The tether is connected to and extends from the dielectric band. The tether is configured to secure the dielectric band in proximity to the battery holder. The tether comprises a securing structure configured for securing the tether to the circuit board. The securing structure is provided at an end of the tether opposed from the dielectric band. The securing structure is comprised of a plug configured to be engaged within a bore defined in the circuit board. Notably, the tether and securing structure can be integrally formed with the dielectric band.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the present invention will now be described with respect to FIGS. 3-9. Embodiments of the present invention generally relate to electronic devices comprising one or more batteries retained in battery holders via battery retainers. Such electronic devices can include, but are not limited to, radios, mobile telephones, cellular telephones, video cameras, recording devices, digital cameras, sensors, and other electronic devices. The battery retainers are configured for preventing the batteries from being dislodged from the battery holders due to external forces. Such external forces include, but are not limited to, impact forces produced by dropping an electronic device.

Notably, the battery retainers overcome certain drawbacks of conventional battery retainers. For example, the battery retainers are less expensive to manufacture as compared to conventional locking bars. The battery retainers are also relatively easy to couple to battery holders. The battery retainers can be coupled to and uncoupled from the battery holders without using tools. The battery retainers also consume less board space as compared to conventional locking bars. The battery retainers are configured to be coupled to a chassis (e.g., a housing of an electronic device) or a printed circuit board chassis (PCB-chassis). This chassis coupling ensures that the battery retainers will not be lost during battery replacement processes.

Before describing the battery retainers of the present invention, it will be helpful in understanding an exemplary environment in which the invention can be utilized. In this regard, it should be understood that the battery retainers of the present invention can be utilized in a variety of different applications where back-up batteries are needed for powering circuit components of an electronic device in the event of a power loss from the primary power source. Such applications include, but are not limited to, radio applications, mobile/cellular telephone applications, visual/audio recording applications, camera applications, sensor applications, and other military/commercial electronic device applications.

Figure 1:
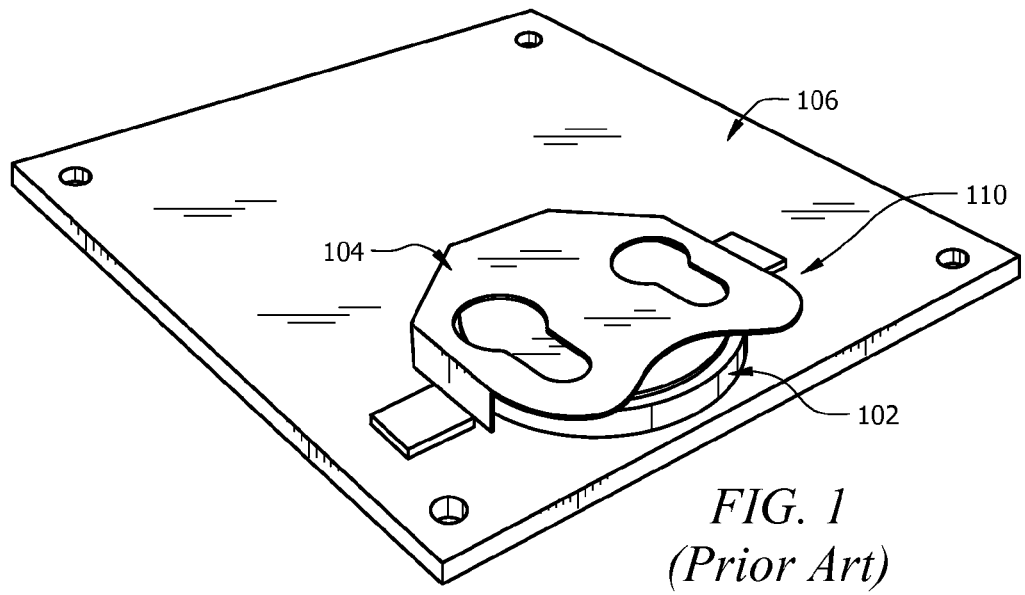
FIG. 1 is a top perspective view of a printed circuit board having a conventional battery holder disposed thereon.
Figure 2:
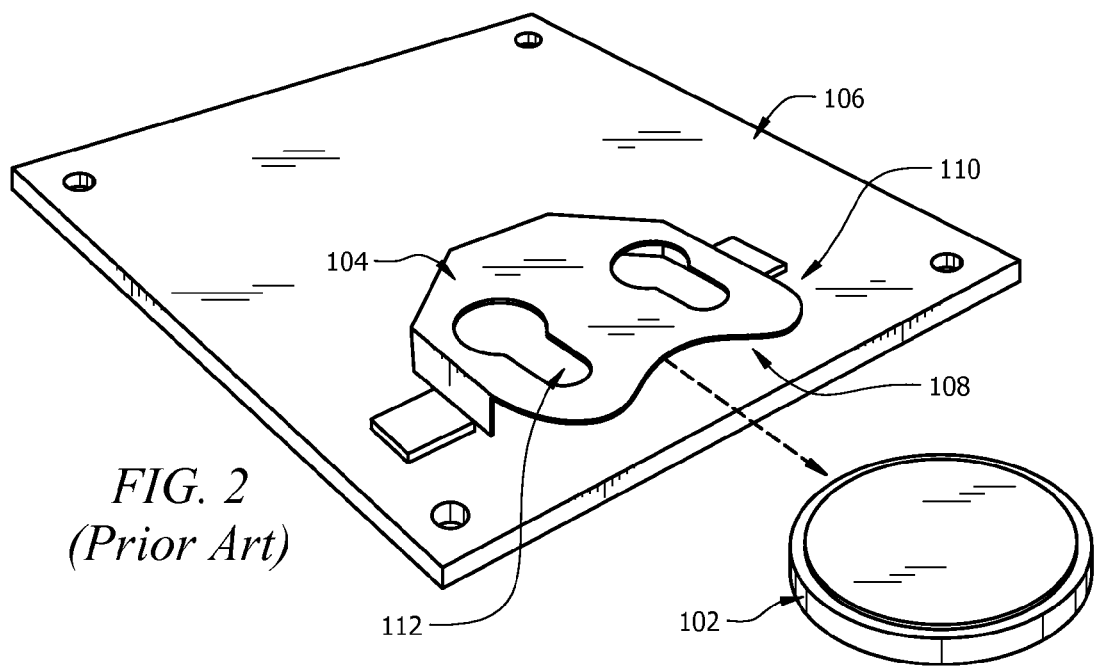
FIG. 2 is a top perspective view of a battery dislodged from the battery holder of FIG. 1.
Figure 3:
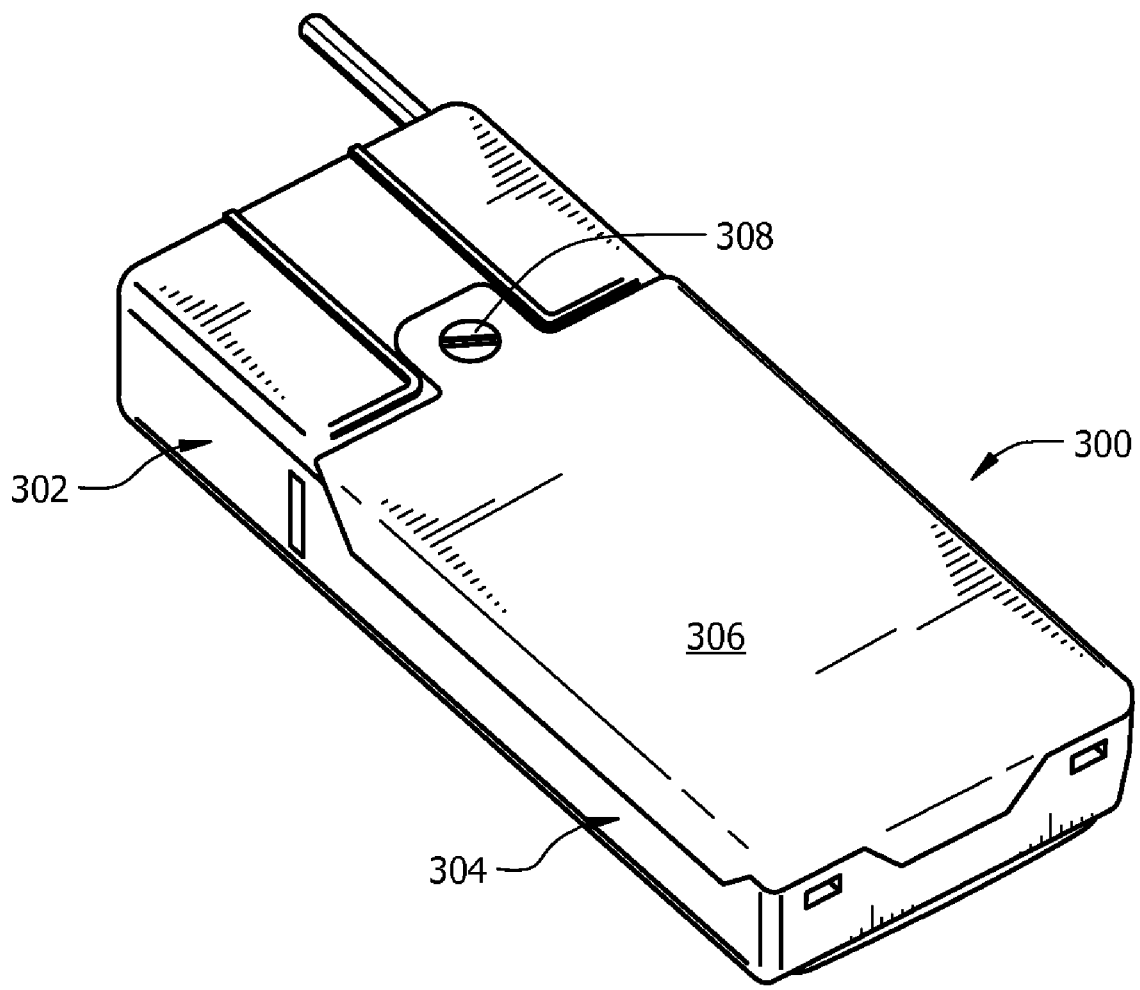
FIG. 3 is a back perspective view of an exemplary electronic device that is useful for understanding the present invention.

Referring now to FIG. 3, there is provided an electronic device 300 that is useful for understanding the present invention. Although electronic device 300 is shown to be a radio, the invention is not limited in this regard. For example, electronic device 300 can be a radio, a mobile telephone, a cellular telephone, a video camera, a recording device, a camera, a sensor, or any other electronic device. As shown in FIG. 3, electronic device 300 is generally comprised of a housing 302 configured to house circuits (not shown), batteries (not shown), and other electronic components (not shown). Housing 302 can be formed from any conductive or non-conductive material. Such conductive materials include, but are not limited to, metal materials and composite materials. Such non-conductive materials include, but are not limited to, rubbers and plastics. Housing 302 is comprised of a main body 304 and a battery cover 306 coupled to the main body 304 via a mechanical connector 308. Battery cover 306 is a removable component facilitating the insertion of at least one primary battery (not shown), PCB, and back-up battery (not shown) into electronic device 300. Battery cover 306 also facilitates the removal of the batteries (not shown) and PCB (not shown) from electronic device 300. This battery removal is accomplished by the de-coupling of the battery cover 306 from the electronic device 300. As a result of the battery cover de-coupling, a user (not shown) has access to the batteries (not shown) for removal of the same.

Figure 4:
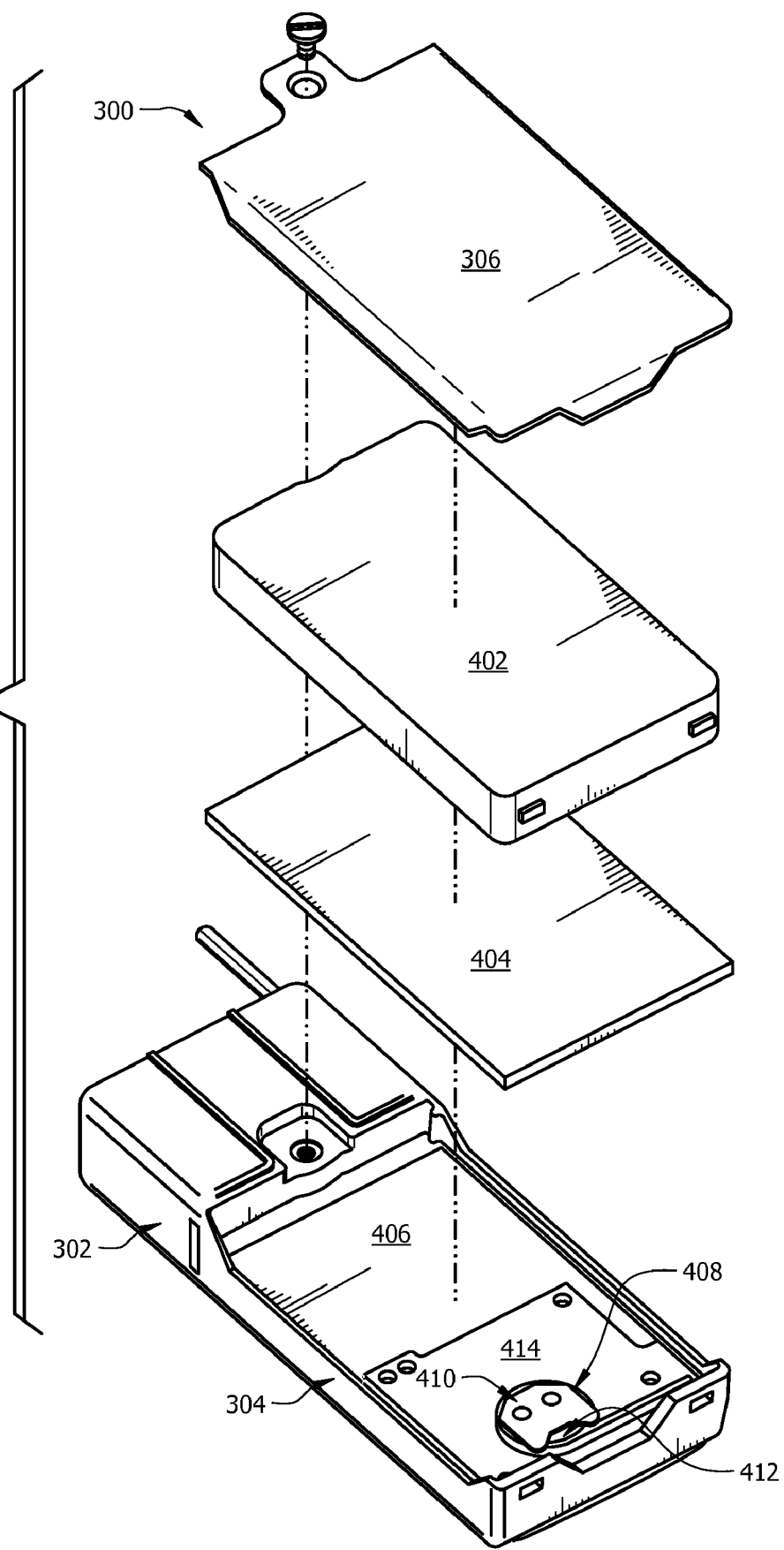
FIG. 4 is a back perspective view of the electronic device of FIG. 3 with a battery cover, a primary battery, and an internal circuit cover removed therefrom.

Referring now to FIG. 4, there is provided a back perspective view of the electronic device 300 having the battery cover 306, a primary battery 402, and an internal circuit cover 404 removed therefrom. As shown in FIG. 4, the electronic device 300 has one or more PCBs 406, 414 disposed therein. Each of the PCBs 406, 414 has circuits (not shown) disposed thereon. The circuits (not shown) can generally comprise circuit components, connectors, electrically conductive traces, and electrically conductive pads. Notably, the present invention is not limited to any particular circuit configuration. All that is necessary for implementation of the present invention is the existence of a battery holder in which a battery can become dislodged due to external forces.

The primary battery 402 is provided for supplying power to the circuits disposed on PCBs 406, 414 during operations of the electronic device 300. The back-up battery 412 is generally provided for powering the circuits (not shown) disposed on PCBs 406, 414 in the event of a power loss from or removal of the primary battery 402. The back-up battery 412 is disposed within a battery holder 410 coupled to PCB 414. The battery holder 410 is configured for facilitating electrical connections between the positive/negative terminals (not shown) of the back-up battery 412 and the circuit (not shown) disposed on PCB 414. The back-up battery 412 is retained in the battery holder 410 via a battery retainer 408. The battery retainer 408 will be described below in relation to FIGS. 5-9.

It should be noted that the back-up battery 412 can be a coin cell battery. Coin cell batteries are well known to those having ordinary skill in the art, and therefore will not be described herein. However, it should be understood that any coin cell battery can be used without limitation. It should also be understood that coin cell batteries typically have a diameter with a value falling within the range of five millimeters to thirty millimeters (5 mm-30 mm). Coin cell batteries also typically have a height with a value falling within the range of one millimeter to thirty millimeters (1 mm-30 mm). The invention is not limited in this regard. Back-up battery 412 can be any type of battery suitable for a particular electronic device application.

Figure 5:
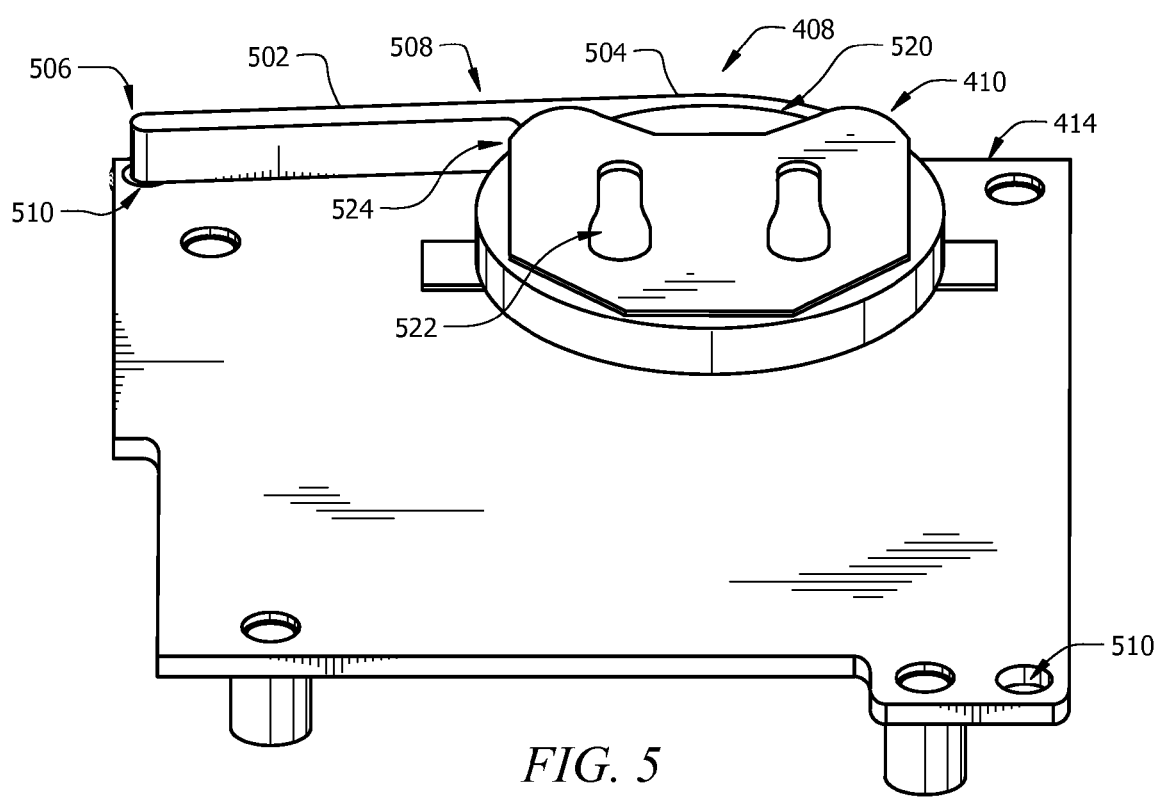
FIG. 5 is a top perspective view of the printed circuit board of FIG. 4 that is useful for understanding the present invention.
Figure 6:
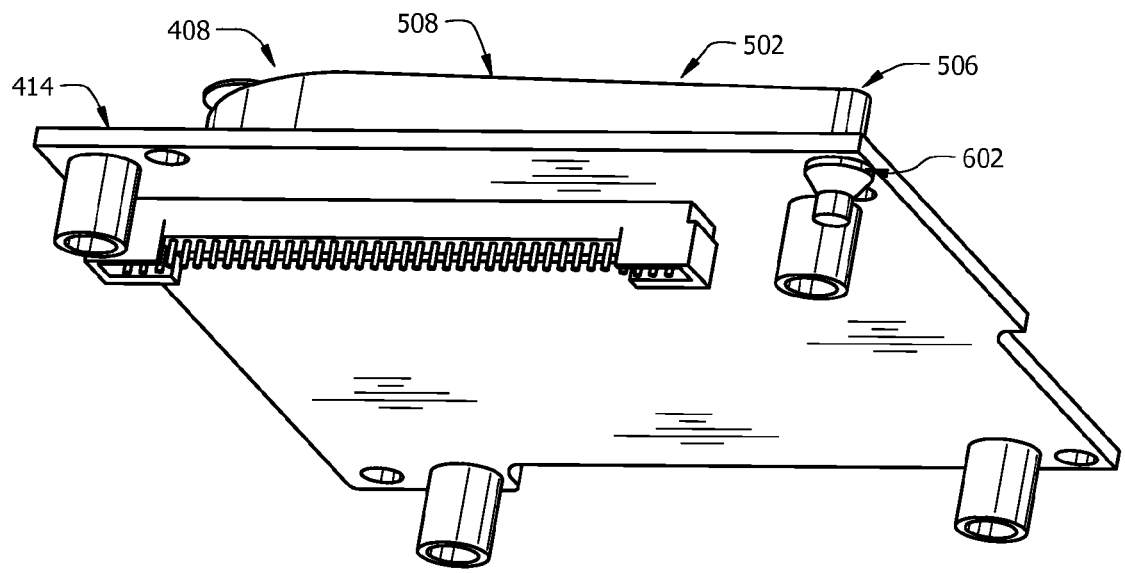
FIG. 6 is a bottom perspective view of the printed circuit board of FIGS. 4-5 that is useful for understanding the present invention.

Referring now to FIG. 5, there is provide a top perspective view of PCB 414. A bottom perspective view of PCB 414 is provided in FIG. 6. As shown in FIGS. 5-6, the battery holder 410 and battery retainer 408 are coupled to PCB 414. It should be noted that battery holder 410 is sized and shaped to define a cavity 522 configured for receiving the back-up battery 412. A slot 520 is provided on a circumferential edge portion 524 of the battery holder 410. The slot 520 is configured to permit the back-up battery 412 to be removably inserted within the cavity 522.

Battery retainer 408 generally comprises a dielectric band 504 and a tether 502 extending therefrom. The dielectric band 504 is configured for being removably attached to the battery holder 410 so as to retain/secure back-up battery 412 (described above in relation to FIG. 4) within battery holder 410.

In this regard, it should be understood that the dielectric band 504 is formed of a dielectric material that can return to its original shape after being stretched, deformed, compressed, and/or expanded. Such dielectric materials include, but are not limited to, rubbers and plastics. In effect, battery retainer 408 can be used with battery holders 410 having various shapes and sizes.

It should also be understood that the dielectric band 504 has a shape and size configured for being stretched and placed around a periphery of the circumferential edge portion 524 of battery holder 410 so as to retain/secure the back-up battery 412 therein. Such shapes include, but are not limited to, circular shapes (as shown in FIG. 5), elliptical shapes, and ring shapes (as shown in FIG. 5). As should be understood, the back-up battery retention is provide by the application of a compressive force or pressure to the battery holder 410 and back-up battery 412 by the dielectric band 504. This compressive force or pressure can be provided by an inner circumference of the dielectric band 504. For example, if an inner circumference of the dielectric band 504 resiliently engages the circumferential edge portion 524 of the battery holder 410, then the compressive force or pressure is applied to the battery holder 410 and/or back-up battery 412 by the dielectric band 504.

As shown in FIGS. 5-6, tether 502 is connected to and extends from the dielectric band 504. Tether 502 is generally configured for securing the dielectric band 504 in proximity to the battery holder 410. In this regard, it should be understood that tether 502 comprises a first opposing end 508 coupled to the dielectric band 504 and a second opposing end 506 having a securing structure 602 extending therefrom. Securing structure 602 facilitates the coupling of battery retainer 408 to PCB 414. In this regard, it should be understood that the securing structure 602 can be comprised of a plug. The plug can be sized and shaped for insertion into an aperture 510 (e.g., a tooling hole) formed through PCB 414. The plug can also be sized and shaped to be engaged within bore 510 defined in PCB 414.

Notably, tether 502 and securing structure 602 are formed of a dielectric material that can return to its original shape after being stretched, deformed, compressed, and expanded. Such dielectric materials include, but are not limited to, rubbers and plastics. In effect, battery retainer 408 can be used in electronic devices comprising variable PCB configurations.

Figure 7:
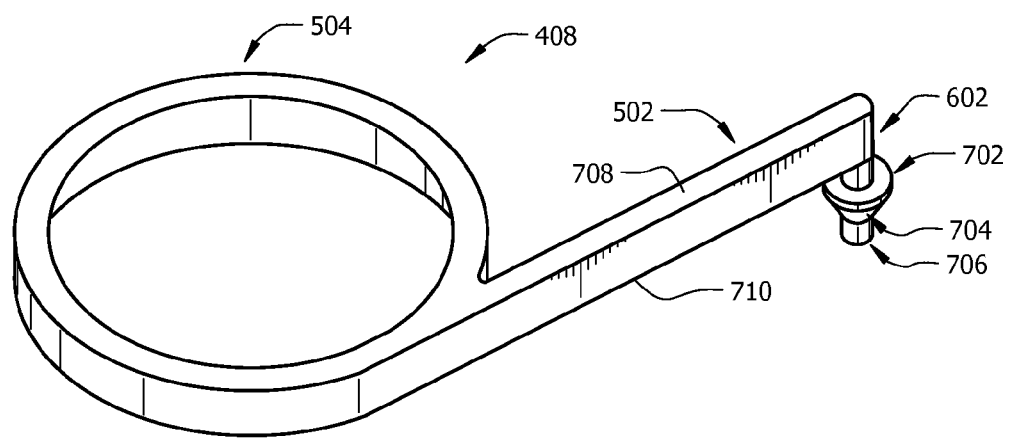
FIG. 7 is a top perspective view of the battery retainer of FIGS. 4-6 that is useful for understanding the present invention.

Referring now to FIG. 7, there is provided a top perspective view of battery retainer 408 that is useful for understanding the present invention. As shown in FIG. 7, battery retainer 408 can be formed as a single component having a substantially p-shape, q-shape, lollipop-shape, or any other shape selected in accordance with a particular battery retainer 408 application. In such a scenario, the tether 502 and securing structure 602 may be integrally molded with dielectric band 504 during a molding process. Such molding processes include, but are not limited to, injection molding processes. Injection molding processes are well known to those having ordinary skill in the art, and therefore will not be described herein. Any known injection molding process can be used to form dielectric band 504 with the tether 502 and/or securing structure 602 integrated therewith.

As noted above, battery retainer 408 can be formed of a dielectric material that can return to its original shape after being stretched, deformed, compressed, and expanded. According to an embodiment of the invention, battery retainer 408 is formed of a silicone rubber having a hardness between thirty (30) and ninety (90) durometers. The silicone rubber is also selected to be a rubber resistant to deformations experienced under extreme heat. The phrase "extreme heat", as used herein, refers to temperatures falling within the range of ninety degrees Fahrenheit (90° F.) to one-hundred twenty-degrees Fahrenheit (120° F.). Such a silicone rubber advantageously applies a constant compressive force or pressure to components 410, 412 through a wide range of temperatures (e.g., 60° F. to 120° F.). Such a silicone rubber also provides a battery retainer 408 with a relatively long life expectancy. The invention is not limited in this regard.

As shown in FIG. 7, securing structure 602 extends away from tether 502 in a downwards direction perpendicular to horizontal planes (not shown) defined by surfaces 708, 710 of the battery retainer 408. However, the invention is not limited in this regard. For example, securing structure 602 can extend away from the tether 502 in an upwards direction perpendicular to the horizontal planes (not shown) defined by surfaces 708, 710. Securing structure 602 can also extend away from tether 502 in a forwards/backwards direction parallel to the horizontal planes (not shown) defined surfaces 708, 710.

Referring again to FIG. 7, securing structure 602 comprises a flange 702, a tapered portion 704, and a post 706. Flange 702 facilitates the coupling of battery retainer 408 to PCB 414 (described above in relation to FIGS. 4-6). This coupling prevents the battery retainer 408 from being lost during battery replacement processes. Flange 702 is formed of a dielectric material that can return to its original shape after being deformed and/or compressed. The deformation and compression of flange 702 can occur when the securing structure 602 passes through the aperture or bore 510 (described above in relation to FIG. 5) formed through PCB 414 (described above in relation to FIGS. 4-6). After the flange 702 has fully passed through aperture or bore 510 (described above in relation to FIG. 5), it returns to it original shape so as to engage a surface of PCB 414 (as shown in FIG. 6). Notably, the diameter of flange 702 is greater than the diameter of the aperture or bore 510 (described above in relation to FIG. 5) formed through PCB 414 (described above in relation to FIGS. 4-6).

Tapered portion 704 is generally a guide configured for ensuring proper alignment of securing structure 602 and aperture 510 (described above in relation to FIG. 5) of PCB 414. Tapered portion 704 can be defined by an angled edge of the flange 702. Angled edge can have an edge angle between fifteen and seventy degrees (15°-70°). The shape of the angled edge can be annular or any other shape selected in accordance with a particular battery retainer application.

Post 706 is configured for facilitating the installation of battery retainer 408. In this regard, it should be understood that the post 706 provides a means for grabbing securing structure 602 and pulling the same through the aperture or bore 510 (described above in relation to FIG. 5) of PCB 414. The post 706 can be grabbed using a tool, such as tweezers, tongs, pincers, and pliers.

Figure 8:
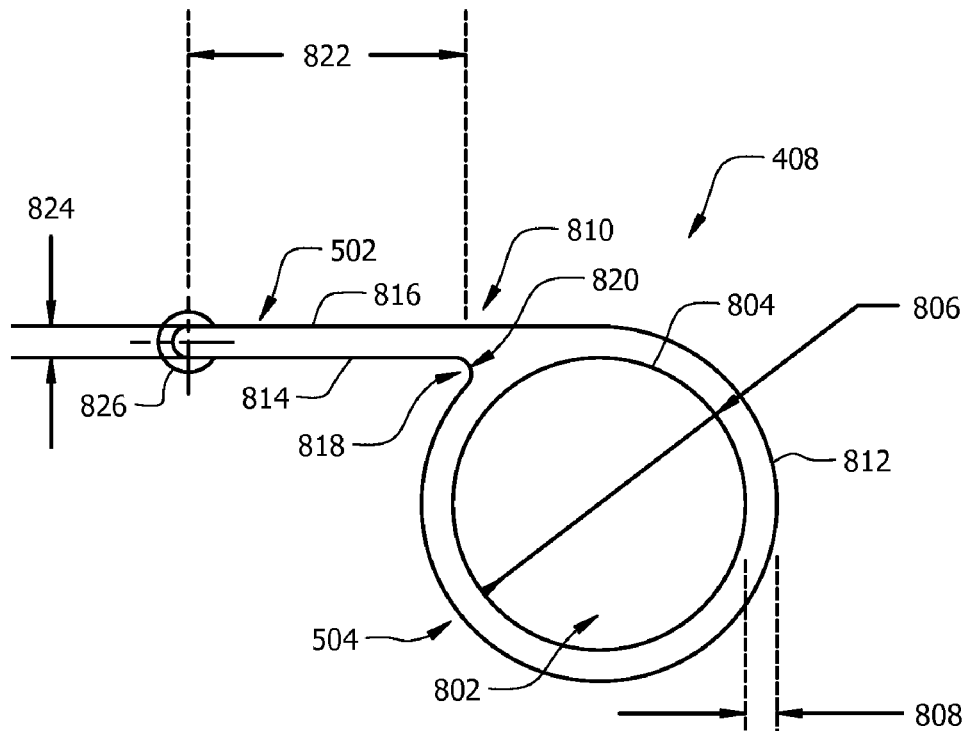
FIG. 8 is a top view of the battery retainer of FIGS. 4-6 that that is useful for understanding the present invention.
Figure 9:
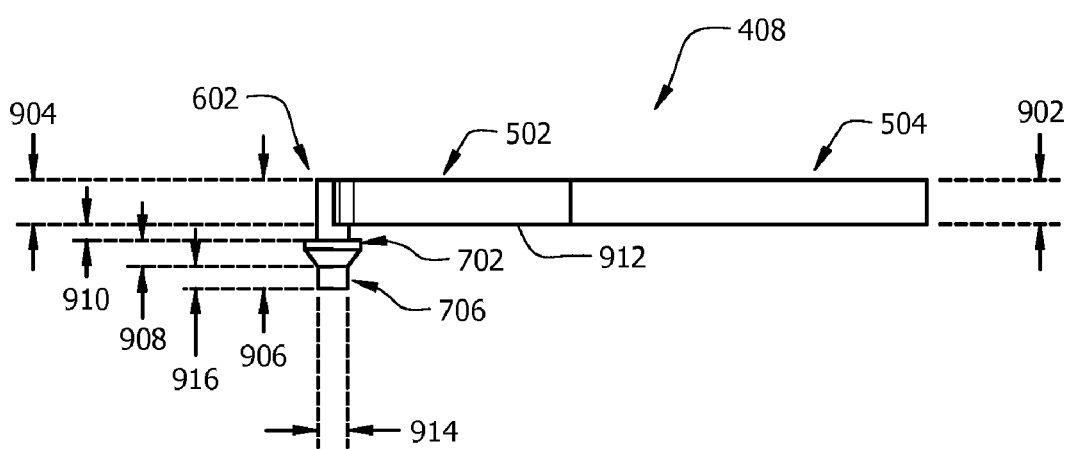
FIG. 9 is a side view of the battery retainer of FIGS. 4-8 that is useful for understanding the invention.

Referring now to FIG. 8, there is provided a top view of the battery retainer 408. A side view of the battery retainer 408 is provided in FIG. 9. As shown in FIGS. 8-9, dielectric band 504 comprises a central aperture 802 formed therethrough. The central aperture 802 has a diameter 806 defined by a sidewall 804. Sidewall 804 has a width 808 and a height 902. Diameter 806 is advantageously smaller than the collective size of the battery holder 410 and back-up battery 412 (described above in relation to FIG. 4). This smaller diameter 806 facilitates the retention of back-up battery 412 within battery holder 410. For example, if sidewall 804 is stretched and placed around a periphery of a circumferential edge portion of the battery holder 410, then sidewall 804 applies a compressive force or pressure on components 410, 412 sufficient for retaining back-up battery 412 within battery holder 410.

This compressive force or pressure is also sufficient for retaining back-up battery 412 within battery holder 410 when external forces are applied thereto.

According to embodiments of the present invention, diameter 806 has a value falling within the range of 0.0800 inch to 1.500 inch. Width 808 has a value falling within the range of 0.080 inch to 0.15 inch. Height 902 has a value falling within the range of 0.100 inch to 0.150 inch. The invention is not limited in this regard. Dielectric band 504 can have any shape and size selected in accordance with a particular battery retainer 408 application.

As also shown in FIGS. 8-9, tether 502 is coupled to dielectric band 504 at a joint 810. Joint 810 can be defined between an exterior surface 812 of sidewall 804 and exterior surfaces 814, 816 of the tether 502. Surfaces 814, 812 can be joined by an angled portion 818 of joint 810. According to embodiments of the present invention, angled portion 818 has a radius 820 with a value falling within the range of 0.050 inch to 0.070 inch. The invention is not limited in this regard.

The tether 502 has a length 822, a width 824, and a height 904. According to embodiments of the present invention, length 822 has a value falling within the range of 0.700 inch to 0.150 inch. Width 824 has a value falling within the range of 0.080 inch to 0.100 inch. Height 904 has a value falling within the range of 0.100 inch to 0.150 inch. The invention is not limited in this regard. The tether 502 can have any size and shape selected in accordance with a particular battery retainer 408 application.

Securing structure 602 can have a generally circular shape with a maximum diameter 826 and a height 906. According to embodiments of the present invention, diameter 826 has a value falling within the range of 0.170 inch to 0.200 inch. Height 906 has a value falling within the range of 0.250 inch to 0.350 inch. The invention is not limited in this regard. Securing structure 602 can have any size and shape selected in accordance with a particular battery retainer 408 application.

The flange 702 can have a generally circular shape with a diameter 826 and a height 908. The flange 702 is spaced a pre-defined distance 910 from a surface 912 of the tether 502. This pre-defined distance 910 can be determined based on the thickness of a PCB. According to embodiments of the present invention, height 908 has a value falling within the range of 0.070 inch to 0.090 inch. Distance 910 has a value within the range of 0.050 inch to 0.070 inch. The invention is not limited in this regard. The flange 702 can have any size and shape selected in accordance with a particular battery retainer 408 application.

The post 706 can have a generally circular shape with a diameter 914 and a height 916. According to embodiments of the present invention, diameter 914 has a value falling within the range of 0.088 inch to 0.098 inch. Height 916 has a value within the range of 0.050 inch to 0.080 inch. The invention is not limited in this regard. The post 706 can have any size and shape selected in accordance with a particular battery retainer 408 application.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

I claim:

1. A low profile coin cell battery retainer assembly, comprising:
    a battery holder configured to be attached to a circuit board, said battery holder sized and shaped to define a cavity configured to receive therein a coin cell type battery;
    a slot provided on a circumferential edge portion of said battery holder, said slot configured to permit said coin cell type battery to be removably inserted within said cavity;
    a dielectric band removably attached to said battery holder and encompassing said slot and a periphery of said circumferential edge portion of said battery holder, wherein said dielectric band secures said coin cell type battery in said cavity.

2. The low profile coin cell battery retainer assembly according to claim 1, wherein said dielectric band is formed of an elastic material and extends completely around a periphery of said circumferential edge portion.

3. The low profile coin cell battery retainer assembly according to claim 1, wherein said dielectric band is formed of silicone rubber.

4. The low profile coin cell battery retainer assembly according to claim 1, wherein said dielectric band has a ring shape.

5. The low profile coin cell battery retainer assembly according to claim 1, wherein said dielectric band is sized and shaped so that an inner circumference of said dielectric band will resiliently engage said circumferential edge portion when extended around a periphery of said circumferential edge portion.

6. The low profile coin cell battery retainer assembly according to claim 1, further comprising a tether connected to and extending from said dielectric band configured to secure said dielectric band in proximity to said battery holder.

7. A low profile coin cell battery retainer assembly, comprising:
    a battery holder configured to be attached to a circuit board, said battery holder sized and shaped to define a cavity configured to receive therein a coin cell type battery;
    a slot provided on a circumferential edge portion of said battery holder, said slot configured to permit said coin cell type battery to be removably inserted within said cavity;
    a dielectric band removably attached to said battery holder and extending around a periphery of said circumferential edge portion, wherein said dielectric band secures said coin cell type battery in said cavity; and
    a tether connected to and extending from said dielectric band configured to secure said dielectric band in proximity to said battery holder;
    wherein said tether further comprises a securing structure configured to secure said tether to said circuit board.

8. The low profile coin cell battery retainer assembly according to claim 7, wherein said securing structure is provided at an end of said tether opposed from said dielectric band.

9. The low profile coin cell battery retainer assembly according to claim 7, wherein said securing structure is comprised of a plug configured to be engaged within a bore defined in said circuit board.

10. The low profile coin cell battery retainer assembly according to claim 7, wherein said tether and said securing structure are integrally formed with said dielectric band.

11. A low profile coin cell battery retainer assembly, comprising:
- a battery holder configured for attachment to a circuit board, said battery holder sized and shaped to define a cavity configured to receive therein a coin cell type battery;
- a slot provided on a circumferential edge portion of said battery holder, said slot configured to permit said coin cell type battery to be removably inserted within said cavity;
- a dielectric band formed of an elastic material encompassing said slot and a periphery of said circumferential edge portion of said battery holder, wherein said dielectric band secures said coin cell type battery in said cavity.

12. The low profile coin cell battery retainer assembly according to claim 11, wherein said dielectric band is formed of silicone rubber.

13. The low profile coin cell battery retainer assembly according to claim 11, wherein said dielectric band is sized and shaped so that an inner circumference of said dielectric band will resiliently engage said circumferential edge portion when extended around said periphery.

14. A low profile coin cell battery retainer assembly, comprising:
- a battery holder configured to be attached to a circuit board, said battery holder sized and shaped to define a cavity configured to receive therein a coin cell type battery;
- a slot provided on a circumferential edge portion of said battery holder, said slot configured to permit said coin cell type battery to be removably inserted within said cavity;
- a dielectric band formed of an elastic material extending completely around a periphery of said circumferential edge portion, wherein said dielectric band secures said coin cell type battery in said cavity; and
- a tether connected to and extending from said dielectric band configured to secure said dielectric band in proximity to said battery holder.

15. The low profile coin cell battery retainer assembly according to claim 14, wherein said tether further comprises a securing structure configured for securing said tether to said circuit board.

16. The low profile coin cell battery retainer assembly according to claim 15, wherein said securing structure is provided at an end of said tether opposed from said dielectric band.

17. The low profile coin cell battery retainer assembly according to claim 16, wherein said tether and said securing structure are integrally formed with said dielectric band.

18. A low profile coin cell battery retainer assembly, comprising:
- a battery holder configured for attachment to a circuit board, said battery holder sized and shaped to define a cavity configured for receiving therein a coin cell type battery;
- a slot provided on a circumferential edge portion of said battery holder, said slot configured to permit said coin cell type battery to be removably inserted within said cavity;
- a dielectric band formed of an elastic material extending completely around a periphery of said circumferential edge portion and across said slot, wherein said dielectric band secures said coin cell type battery in said cavity; and
- an elongated tether connected to and extending from said dielectric band, and configured to secure said dielectric band in proximity to said battery holder.

19. The low profile coin cell battery retainer assembly according to claim 18, wherein said tether further comprises a securing structure provided at an end of said tether opposed from said dielectric band, said securing structure configured for securing said tether to said circuit board, said tether and said securing structure integrally formed with said dielectric band.

* * * * *